United States Patent [19]
Gerry

[11] Patent Number: 5,800,898
[45] Date of Patent: Sep. 1, 1998

[54] TUFTED CARPET AND PROCESS FOR PREPARING SAME

[75] Inventor: Stephen W. Gerry, Ponte Vedra Beach, Fla.

[73] Assignee: K2, Inc., Adrian, Mich.

[21] Appl. No.: 756,983

[22] Filed: Nov. 26, 1996

[51] Int. Cl.$^6$ ............................................. B32B 3/02
[52] U.S. Cl. ............................ 428/95; 428/96; 428/97
[58] Field of Search .......................... 428/95, 96, 97

[56] References Cited

U.S. PATENT DOCUMENTS

| | | |
|---|---|---|
| Re. 34,951 | 5/1995 | Slosberg et al. . |
| 3,551,231 | 12/1970 | Smedberg . |
| 3,640,786 | 2/1972 | Carpenter ................................. 428/95 |
| 3,940,525 | 2/1976 | Ballard . |
| 4,153,749 | 5/1979 | Klein . |
| 4,522,857 | 6/1985 | Higgins . |
| 4,702,950 | 10/1987 | Slosberg et al. . |
| 4,808,459 | 2/1989 | Smith et al. . |
| 4,844,765 | 7/1989 | Reith . |
| 4,875,954 | 10/1989 | Griffiths et al. . |
| 5,240,530 | 8/1993 | Fink ................................. 156/72 |
| 5,256,224 | 10/1993 | Gillynes et al. ................................. 156/72 |
| 5,283,097 | 2/1994 | Gillyns et al. . |
| 5,288,349 | 2/1994 | Fink . |
| 5,445,860 | 8/1995 | Bova . |

*Primary Examiner*—Terrel Morris
*Attorney, Agent, or Firm*—Donald R. Fraser

[57] ABSTRACT

A tufted carpet comprises consecutively a primary backing, stitched with loops of yarn to form a tufted structure projecting outwardly from the primary backing, a polyolefin locking layer, a moisture barrier polyolefin layer, and a secondary backing comprising a woven polyolefin.

11 Claims, 1 Drawing Sheet

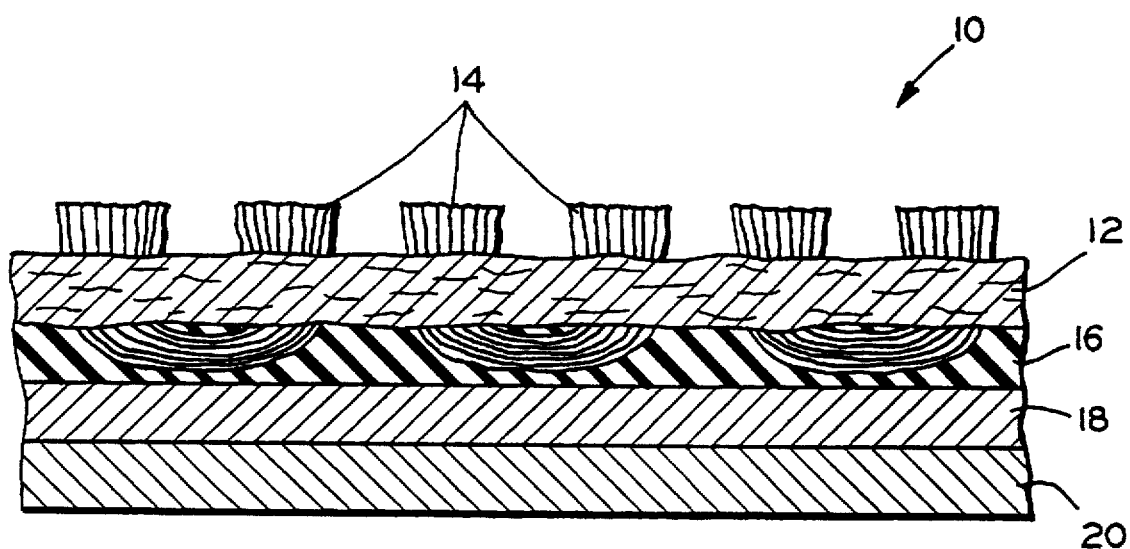

TUFTED CARPET AND PROCESS FOR PREPARING SAME

FIELD OF THE INVENTION

The present invention relates generally to a tufted carpet and a process for preparing same. More particularly, the invention is directed to a tufted carpet including, inter alia, a moisture barrier layer, and to a process for assembling various carpet components and laminating same to prepare a tufted carpet.

BACKGROUND OF THE INVENTION

It is well-known to prepare tufted carpet by stitching a primary backing material with yarn in such a manner so as to form on the top surface of the backing material a pile comprising numerous closely spaced erect loops of yarn. Typically, the bottom surface of the primary backing material is thereafter coated with a polymeric adhesive and a secondary backing material is adhered thereto. Finally, the assembled structure is passed through an oven and a compression zone to cure the polymeric adhesive and laminate the assemblage into a monolithic tufted carpet structure. By this process, the yarn tufts are banded to the primary backing material, and the secondary backing material is simultaneously banded to the tufted carpet structure.

While the production process of the prior art includes the insertion of a cured polymeric layer, many of the tufted carpet structures produced by this well-known process do not contain an effective moisture barrier because of inconsistencies in the application of the polymeric adhesive layer, the variableness of the heating and curing process, and the like.

U.S. Pat. No. 4,153,749 discloses a tufted carpet structure comprising consecutive layers of a tufted primary backing, a latex layer, a layer of an electrically conductive polymer, and a secondary backing. Such an assemblage results in a low static carpet, but does not insure that the tufted carpet will contain an effective moisture barrier.

It would be desirable to prepare a tufted carpet having an improved moisture barrier, by a commercially feasible process.

SUMMARY OF THE INVENTION

Accordant with the present invention there surprisingly has been discovered an improved tufted carpet, comprising:

a primary backing stitched with loops of yarn to form a tufted structure projecting outwardly from said primary backing;

a polyolefin locking layer affixed to the primary backing;

a moisture barrier polyolefin layer affixed to the polyolefin locking layer; and a secondary backing, comprising a woven polyolefin, affixed to the moisture barrier polyolefin layer.

The invention further includes a process for preparing a tufted carpet, comprising the steps of:

providing a primary backing stitched with loops of yarn to form a tufted structure projecting outwardly from said backing;

applying a polyolefin locking layer to the primary backing;

laminating together the primary backing and polyolefin locking layer, to affix the polyolefin locking layer to the primary backing and simultaneously lock the loops of yarn in the primary backing;

providing a secondary backing, comprising a woven polyolefin;

applying a moisture barrier polyolefin layer to the polyolefin locking layer;

contacting the moisture barrier polyolefin layer to the polyolefin locking layer; and laminating together the primary backing, polyolefin locking layer, moisture barrier polyolefin layer, and secondary backing.

The tufted carpet according to the present invention, as well as the process for making same, is particularly well suited for producing carpeting for use in commercial and residential buildings, motor vehicles, and the like.

BRIEF DESCRIPTION OF THE DRAWING

The novel features that are considered characteristic of the invention are set forth with particularity in the appended claims. The invention itself, however, will best be understood from the accompanying description of specific embodiments, when read in conjunction with the attendant drawing, in which:

The FIGURE is a side elevational view of an embodiment of a tufted carpet according to the present invention.

DETAILED DESCRIPTION OF THE PREFERRED EMBODIMENTS

Referring now to the FIGURE, there is shown generally at 10 a schematic, side elevational view of an embodiment of a tufted carpet according to the present invention. The tufted carpet comprises a primary backing 12 stitched with loops of yarn 14 to form a tufted structure projecting from the primary backing 12. A polyolefin locking layer 16 is affixed to the underside of the primary backing 12 which effectively locks the loops of yarn 14 thereto. A layer of polyolefin 18 is affixed to the polyolefin locking layer 16, which layer 18 effectively provides a moisture barrier for the tufted carpet 10. A secondary backing 20 is affixed to the moisture barrier polyolefin layer 18. The secondary backing 10 provides dimensional stability and rigidity to the tufted carpet 10, thereby facilitating the handleability of same.

The primary backing which is stitched with the pile yarn can be any sheet material conventionally used as the primary backing of a tufted carpet. Useful primary backing materials include, but are not necessarily limited to, woven jute, woven cotton fabric, woven and non-woven fabrics made from synthetic fibers such as, for example, polypropylene, polyethylene, polyamide, polyester, a rayon, and the like, as well as blends, combinations, and copolymers thereof.

Tufting is conventionally accomplished by inserting reciprocating needles threaded with yarn into the primary backing to form tufts or loops of yarn which project outwardly from one of the major surfaces of the primary backing. Useful materials from which the loops of yarn may be prepared include, but are not necessarily limited to, polyester, polyamide, polypropylene, polyethylene, polyurethane, polycarbonate, polyacetal, nylon, and the like, as well as blends, combinations, and copolymers thereof.

Primary backing materials stitched with loops of yarn to form a tufted structure projecting outwardly from one of the major surfaces thereof which are useful for manufacturing multilayered carpet structures are commercially available and well-known in the art. A preferred primary backing containing tufts of yarn may be obtained from Mohawk Industries, Inc. under the product designation Bigelow.

The polyolefin locking layer according to the present invention may be prepared from polyolefins selected from, but not necessarily limited to, high, medium, or low density polyethylene, polypropylene, polybutylene, and the like, as well as blends and copolymers thereof. A preferred polyolefin is linear low density polyethylene. The polyolefin locking layer may have a thickness ranging from about 0.1 inch to about 0.4 inch, and may either be clear or pigmented. A preferred linear low density polyethylene, from which the polyolefin locking layer may be extrusion coated onto the primary backing, may be obtained from Chevron Corporation under the product designation #1017.

The moisture barrier polyolefin layer according to the present invention may be prepared from any of the polyolefins listed above as useful for preparing the polyolefin locking layer. The polyolefin used for the moisture barrier polyolefin layer may be the same or different from the polyolefin used for the polyolefin locking layer. A preferred polyolefin for making the moisture barrier polyolefin layer is linear low density polyethylene. The moisture barrier polyolefin layer may have a thickness ranging from about 0.001 inch to about 0.4 inch, and may either be clear or pigmented. A preferred linear low density polyethylene from which the moisture barrier polyolefin layer may be extrusion coated, may be obtained from Chevron Corporation under the product designation #1017.

The secondary backing according to the present invention comprises a polyolefin film including reinforcing filaments. Examples of useful polyolefin materials include, but are not necessarily limited to, high, medium, and low density polyethylene, polypropylene, polybutylene, and the like, as well as blends and copolymers thereof. A preferred polyolefin is high density polyethylene. The reinforcing filaments may comprise conventional materials such as, for example, glass or metal fibers, or polymeric fibers made from polyester, acrylic polycarbonate, and the like, as well as blends, combinations, and copolymers thereof. The reinforcing filaments are present in the woven polyolefin fabric in a concentration from about a 4×2 to about a 24×24 tape count per inch. A preferred woven polyolefin may be obtained from Amoco Fabric & Fibers Division under the product designation Style #3824.

The present invention moreover contemplates a method for preparing a tufted carpet. A primary backing stitched with loops of yarn to form a tufted structure projecting outwardly from the primary backing is provided. A polyolefin locking layer is applied to the primary backing. The primary backing and polyolefin locking layer are laminated together, to affix the polyolefin locking layer to the primary backing and lock the loops of yarn to the primary backing. A secondary backing is provided, and a moisture barrier polyolefin layer is applied to a surface thereof. The moisture barrier polyolefin layer is contacted to the polyolefin locking layer, and the entire assemblage is laminated together. Thus, a tufted carpet having a pin-hole-free polyolefin moisture barrier is prepared.

In operation, the polyolefin locking layer is applied to the primary backing by conventional means such as, for example, extrusion coating, roll coating, spraying, dipping, doctor blading, contacting the primary backing with a sheet of polyolefin, etc. Preferably, the polyolefin locking layer is applied by the well-known extrusion coating process. Generally, the extrusion coating die is maintained at a temperature from about 400° F. to about 700° F., depending upon the polyolefin utilized, the thickness of the layer of polyolefin desired, the rate of advance of the primary backing web, etc. Preferably, the extrusion temperature ranges from about 580° F. to about 625° F. The polyolefin locking layer is applied to a thickness from about 0.1 to about 0.4 inch.

The primary backing and polyolefin locking layer are laminated together utilizing heat and pressure in a conventional laminating apparatus. Lamination may be accomplished by passing the laminae between heated rolls or through a heated belt press. Optionally, the laminae may be preheated by conventional means such as, for example, gas fired or electrical resistance heating ovens, and thereafter passed through conventional compression apparatus such as, for example, a series of driven rolls. Typical lamination pressures generally range from about 10 pounds per linear inch to about 200 pounds per linear inch, while laminating temperatures typically range up to about 350° F. This step effectively affixes the polyolefin locking layer to the primary backing and simultaneously locks the loops of yarn to the primary backing. The thickness of the polyolefin locking layer is sufficient to completely encapsulate the loops of yarns. Methods and apparatus for laminating plies of materials together are well-known in the art.

The moisture barrier polyolefin layer is applied to the secondary backing by any conventional method such as those listed hereinabove. This causes the moisture barrier polyolefin layer to become affixed to the secondary backing. Preferably, the moisture barrier polyolefin layer is extrusion coated onto the secondary backing. Convenient extrusion coating temperatures may range from 400° F. to about 700° F. Preferably, the temperature ranges from about 580° F. to about 625° F.

While the moisture barrier polyolefin layer is still at least partially molten, as applied from the extrusion coating die, it is contacted to the polyolefin locking layer. Thus, the moisture barrier polyolefin layer is adhered and becomes affixed to the polyolefin locking layer. Moreover, while the moisture barrier polyolefin layer is still hot, the entire assemblage, comprising the primary backing, polyolefin locking layer, moisture barrier polyolefin layer, and secondary backing, is laminated together to form the tufted carpet structure according to the present invention. The lamination pressure may range from about 10 pounds per linear inch to about 200 pounds per linear inch.

In the case where the application of the moisture barrier polyolefin layer to the secondary backing does not result in a molten moisture barrier polyolefin layer, the moisture barrier polyolefin layer is contacted to the polyolefin locking layer and the entire assemblage, comprising the primary backing, polyolefin locking layer, moisture barrier polyolefin layer, and secondary backing, is passed through a heated laminating station or is preheated and passed through a conventional lamination (compression) station at the pressures and temperatures set forth above.

Thus, the moisture barrier polyolefin layer is affixed to the polyolefin locking layer, forming the tufted carpet according to the present invention.

It must be noted that the disclosed process conditions and materials are not sharply critical for the successful preparation of a tufted carpet structure, according to the present invention. The process conditions and materials of construction described hereinabove are generally disclosed in terms which are conventional in the art to the practice of this invention. Occasionally, however, the process conditions and materials as described may not be precisely applicable for each structure included within the disclosed scope.

Those instances where this occurs will be readily recognizable by those ordinarily skilled in the art. In all such cases, either the process or materials may be modified in a conventional manner known to those ordinarily skilled in the art, e.g., by increasing or decreasing lamination temperatures and/or pressures, by varying the thicknesses of various laminae, by routine substitutions of operable materials, etc., or other process conditions or materials which are otherwise conventional will be applicable to the present invention.

From the foregoing description, one ordinarily skilled in the art can easily ascertain the essential characteristics of this invention and, without departing from its spirit and scope, can make various changes and modifications to adapt the invention to various uses and conditions.

What is claimed is:

1. A tufted carpet, comprising:

a primary backing stitched with loops of yarn to form a tufted structure projecting outwardly from said primary backing;

a polyolefin locking layer affixed to the primary backing, said polyolefin locking layer completely encapsulating the loops of yarn;

a moisture barrier polyolefin layer affixed to the polyolefin locking layer; and a secondary backing, comprising a woven polyolefin and reinforcing fibers selected from glass, metal, polyester, acrylic, and polycarbonate fibers, as well as blends, combinations, and copolymers thereof, affixed to the moisture barrier polyolefin layer.

2. The tufted carpet according to claim 1, wherein the primary backing is prepared from jute, cotton, or synthetic fibers selected from polypropylene, polyethylene, polyamide, polyester, and rayon, as well as blends, combinations, and copolymers thereof.

3. The tufted carpet according to claim 1, wherein the loops of yarn are prepared from polyester, polyamide, polypropylene, polyethylene, polyurethane, polycarbonate, polyacetal, or nylon, as well as blends, combinations, and copolymers thereof.

4. The tufted carpet according to claim 1, wherein the polyolefin locking layer is selected from high, medium, and low density polyethylene, polypropylene, and polybutylene, as well as blends and copolymers thereof.

5. The tufted carpet according to claim 4, wherein the polyolefin is low density polyethylene.

6. The tufted carpet according to claim 1, wherein the polyolefin locking layer ranges in thickness from about 0.1 inch to about 0.4 inch.

7. The tufted carpet according to claim 1, wherein the moisture barrier polyolefin layer is selected from high, medium, and low density polyethylene, polypropylene, and polybutylene, as well as blends and copolymers thereof.

8. The tufted carpet according to claim 7, wherein the polyolefin is low density polyethylene.

9. The tufted carpet according to claim 1, wherein the moisture barrier polyolefin layer ranges in thickness from about 0.001 inch to about 0.4 inch.

10. The tufted carpet according to claim 1, wherein the secondary backing comprises a polyolefin film selected from high, medium, and low density polyethylene, polypropylene, and polybutylene, as well as blends and copolymers thereof.

11. The tufted carpet according to claim 1, wherein the secondary backing reinforcing fibers are present in a concentration from about 4×2 to about 24×24 tape count per inch.

* * * * *